US007286851B2

(12) United States Patent
Nakagomi (10) Patent No.: US 7,286,851 B2
(45) Date of Patent: Oct. 23, 2007

(54) COMMUNICATION TERMINAL CAPABLE OF UTILIZING MULTIPLE RADIO COMMUNICATION SYSTEMS, AND SOFTWARE TRANSMITTING SERVER AND IC CARD WRITER FOR COMMUNICATION SOFTWARE

(75) Inventor: Hisashi Nakagomi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 401 days.

(21) Appl. No.: 10/626,593

(22) Filed: Jul. 25, 2003

(65) Prior Publication Data

US 2004/0152488 A1 Aug. 5, 2004

(30) Foreign Application Priority Data

Jul. 26, 2002 (JP) ............................. 2002-218174

(51) Int. Cl.
*H04Q 7/20* (2006.01)
*H04Q 7/32* (2006.01)

(52) U.S. Cl. ................ 455/558; 455/422.1; 455/552.1; 455/550.1; 455/575.1; 455/412.1; 455/403; 455/418

(58) Field of Classification Search ............. 455/552.1, 455/550.1, 553.1, 575.1, 422.1, 403, 435.1, 455/432.1, 414.1, 414.3, 445, 500, 517, 558, 455/412.1, 412.2, 551, 418, 419, 420, 426.1, 455/426.2
See application file for complete search history.

(56) References Cited

U.S. PATENT DOCUMENTS

| | | | | |
|---|---|---|---|---|
| 5,946,634 A | * | 8/1999 | Korpela | 455/552.1 |
| 5,999,811 A | * | 12/1999 | Molne | 455/432.3 |
| 6,108,562 A | * | 8/2000 | Rydbeck et al. | 455/552.1 |
| 6,198,919 B1 | * | 3/2001 | Buytaert et al. | 455/426.1 |
| 6,199,755 B1 | | 3/2001 | Matsumoto et al. | |
| 6,879,600 B1 | * | 4/2005 | Jones et al. | 370/466 |
| 2002/0184236 A1 | | 12/2002 | Donath et al. | 707/104.1 |
| 2003/0023614 A1 | | 1/2003 | Newstrom et al. | 707/104.1 |
| 2003/0128182 A1 | | 7/2003 | Donath et al. | 345/156 |

(Continued)

FOREIGN PATENT DOCUMENTS

CN 1206163 A 1/1999

(Continued)

OTHER PUBLICATIONS

Office Communication from U.S. Appl. No. 09/968,724, filed Oct. 1, 2001. Date of Office Communication Dec. 1, 2004.

(Continued)

*Primary Examiner*—Keith Ferguson
(74) *Attorney, Agent, or Firm*—Oblon, Spivak, McClelland, Maier & Neustadt, P.C.

(57) ABSTRACT

A communication terminal capable of utilizing a plurality of radio communication services respectively provided by a plurality of radio communication systems establishing a shared radio communication system is provided. The communication terminal comprises a hardware processing unit for performing common hardware processing necessary for utilizing each of the radio communication services; an IC card that stores a plurality of communication software packages necessary for respective radio communication services; a software selection unit that selects one communication software package out of the communication software packages stored in the IC card, which corresponds to a communication service to be utilized; and a software executing unit that executes the selected communication software package.

5 Claims, 5 Drawing Sheets

U.S. PATENT DOCUMENTS

2003/0148786 A1* 8/2003 Cooper et al. .............. 455/552
2004/0219915 A1* 11/2004 Bamburak et al. ....... 455/435.2

FOREIGN PATENT DOCUMENTS

| EP | 0 782 358 | 7/1997 |
|----|-----------|--------|
| EP | 0 941 002 | 9/1999 |
| GB | 2 294 844 | 5/1996 |
| JP | 11-18146 | 1/1999 |
| JP | 2000-269848 | 9/2000 |
| JP | 2000-308135 | 11/2000 |
| JP | 2002-76965 | 3/2002 |
| WO | WO98/58509 | 12/1998 |
| WO | WO 01/90890 | 11/2001 |
| WO | WO 02/01371 A1 | 1/2002 |
| WO | WO 02/37203 | 5/2002 |

OTHER PUBLICATIONS

U.S. Appl. No. 09/618,613, filed Jul. 18, 2000.

* cited by examiner

COMMUNICATION TERMINAL CAPABLE OF UTILIZING MULTIPLE RADIO COMMUNICATION SYSTEMS, AND SOFTWARE TRANSMITTING SERVER AND IC CARD WRITER FOR COMMUNICATION SOFTWARE

BACKGROUND OF THE INVENTION

1. Field of the Invention

The present invention generally relates to a shared radio communication system established by a plurality of radio communication systems, communication terminals capable of utilizing each of radio communication services provided by such a plurality of radio communication systems, and IC card writers for writing radio communication software into IC cards to be attached to communication terminals.

2. Description of the Related Art

A variety of radio communication systems have been developed recently. These radio communication systems provide different services and have different service areas. Accordingly users have to use different communication terminals in order to utilize different radio communication systems. It is, however, inconvenient to carry a plurality of communication terminals, and therefore one communication terminal (referred to as "shared communication terminal" hereinafter) that can be shared or can be commonly used for a plurality of radio communication systems has been developed recently.

Such conventional shared communication terminals, however, have one hardware set that can be commonly used for a plurality of predetermined radio communication systems. The conventional shared communication terminals cannot be utilized for other radio communication systems for which the built-in hardware is not compatible.

Radio communication software packages necessary for utilizing each communication service are pre-installed in the conventional communication terminals and cannot be rewritten. Therefore, users have to purchase a new communication terminal in order to utilize a new communication service provided by a new radio communication system.

One another approach is shown in Japanese Patent Laid-open Publication No. 11-73095, in which a converter provided between a base station and communication terminals is used for a plurality of radio communication services. In this technology, a special converter is provided separately from communication terminals, introducing complexity and inconvenience.

SUMMARY OF THE INVENTION

Accordingly, it is one object of the present invention to provide a communication terminal that is capable of easily utilizing a plurality of radio communication services respectively provided by a plurality of radio communication systems establishing a shared radio communication system.

Another and more specific object of the present invention is to provide a communication terminal capable of utilizing a plurality of radio communication services respectively provided by a plurality of radio communication systems establishing a shared radio communication system, comprising: a hardware processing unit for performing common hardware processing necessary for utilizing the radio communication services; an IC card that stores a plurality of communication software packages necessary for the respective radio communication services; a software selection unit that selects one communication software package out of the communication software packages stored in the IC card, which corresponds to a communication service to be utilized; and a software executing unit that executes the selected communication software package.

The communication software package stored in the IC card can comprise a software program relating to signal transmission/reception, a software program relating to signal modulation/demodulation and a software program relating to application.

The communication terminal can further comprise a software acquisition unit that acquires a communication software package stored in a server provided in the shared communication system.

The software selection unit can comprise a software reading unit that reads a communication software package out of the communication software packages stored in the IC card, which corresponds to a communication service to be utilized.

Another object of the invention is to provide a software transmitting server, comprising: a software storing unit that stores a plurality of software packages respectively necessary for utilizing a plurality of communication services respectively provided by a plurality of radio communication systems; and a software transmitting unit that transmits the stored communication software packages to a communication terminal.

A further object of the invention is to provide an IC card writing apparatus, comprising: a software storing unit that stores the software packages respectively necessary for utilizing the communication services respectively provided by a plurality of radio communication systems; and a software transmitting unit that transmits the stored communication software packages to an IC card to be attached to a communication terminal.

According to one feature of the present invention, the general purpose hardware performs common hardware processing only, and other processing unique to each communication service is performed by the software processing part using the respective communication software package stored in the IC card. Therefore, the shared communication terminal depends as little as possible on the hardware, and can easily utilize many communication services provided by many radio communication systems.

Since a plurality of communication software packages necessary for utilizing communication services provided by a plurality of communication system are stored in an IC card, when a user wants to change his/her communication terminal, he/she only has to insert the original IC card into a new communication terminal to reduce or avoid inconvenience of the terminal changing process.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an apparatus particularly pointed out in the specification in such full, clear, concise, and exact terms as to enable a person having ordinary skill in the art to practice the invention.

DESCRIPTION OF THE PREFERRED EMBODIMENTS

In the following, embodiments of the present invention are described with reference to the accompanying drawings.

Figure 1:
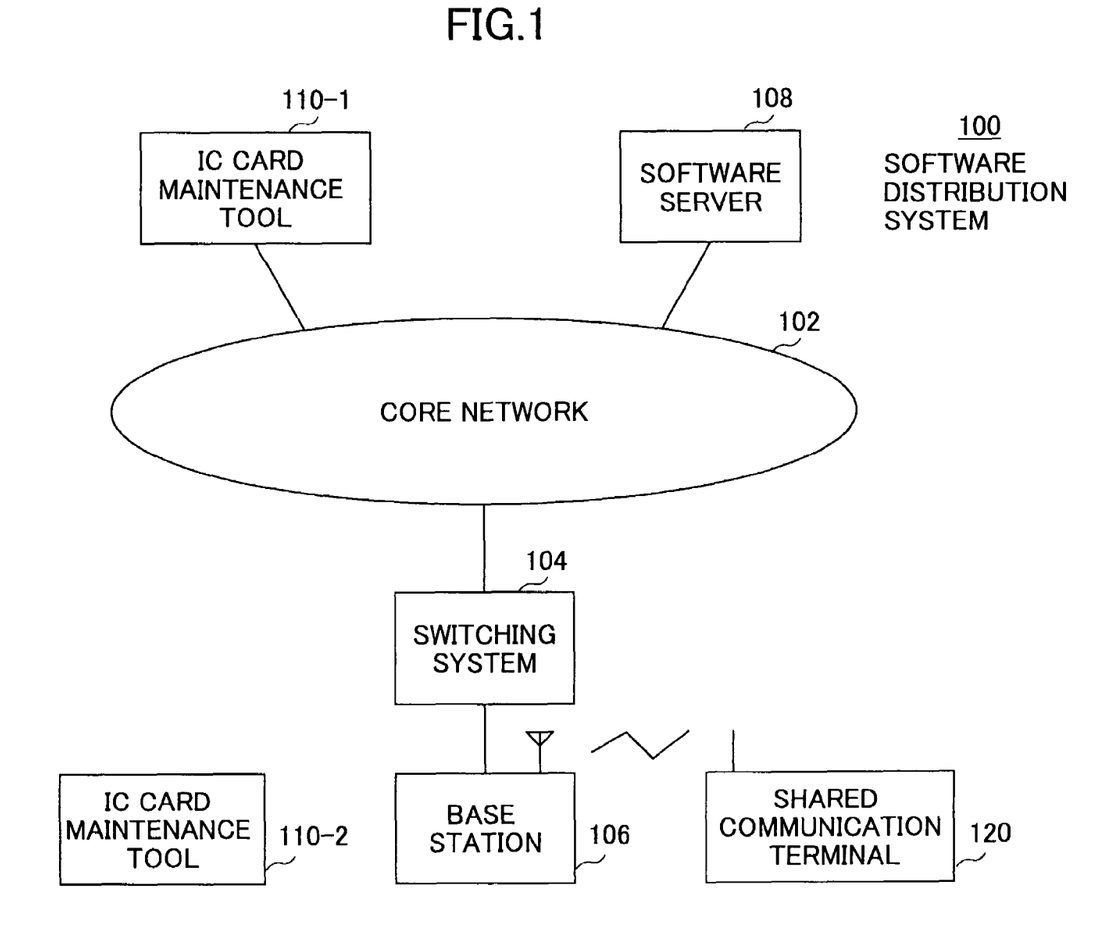
FIG. 1 shows a basic concept of a software distributing system according to the present invention.

FIG. 1 schematically shows a concept of a software distribution system according to the present invention. The communication distribution system 100 shown in FIG. 1 includes a core network 102 for a shared radio communication system established by a plurality of radio communication systems, a switching system 104, a base station 106, a software server 108 for storing communication software packages, IC card maintenance tools 110-1 and 110-2 (hereinafter referred to as merely "IC card maintenance tool 110" for indicating both tools), and a shared communication terminal such as a mobile communication terminal 120.

The software server 108 and the IC card maintenance tool 110-1 are connected to the core network 102. On the other hand, the IC card maintenance tool 110-2 is not connected to the core network 102 and stands alone.

In this communication software distribution system 100, the software server 108 transmits communication software packages necessary for utilizing communication services provided by the plural radio communication systems to the shared communication terminal 120 via the core network 102, the switching system 104 and the base station 106. The IC card maintenance tool 110 writes the communication software packages necessary for utilizing communication services provided by the plural radio communication systems into the IC card attached to the shared communication terminal 120. The shared communication terminal 120 acquires these software packages from the software server 108 or the IC card maintenance tool 110, selects one communication software package corresponding to a communication service to be utilized, and executes the selected communication software package, to utilize the communication service selected out of the multiple communication services.

Figure 2:
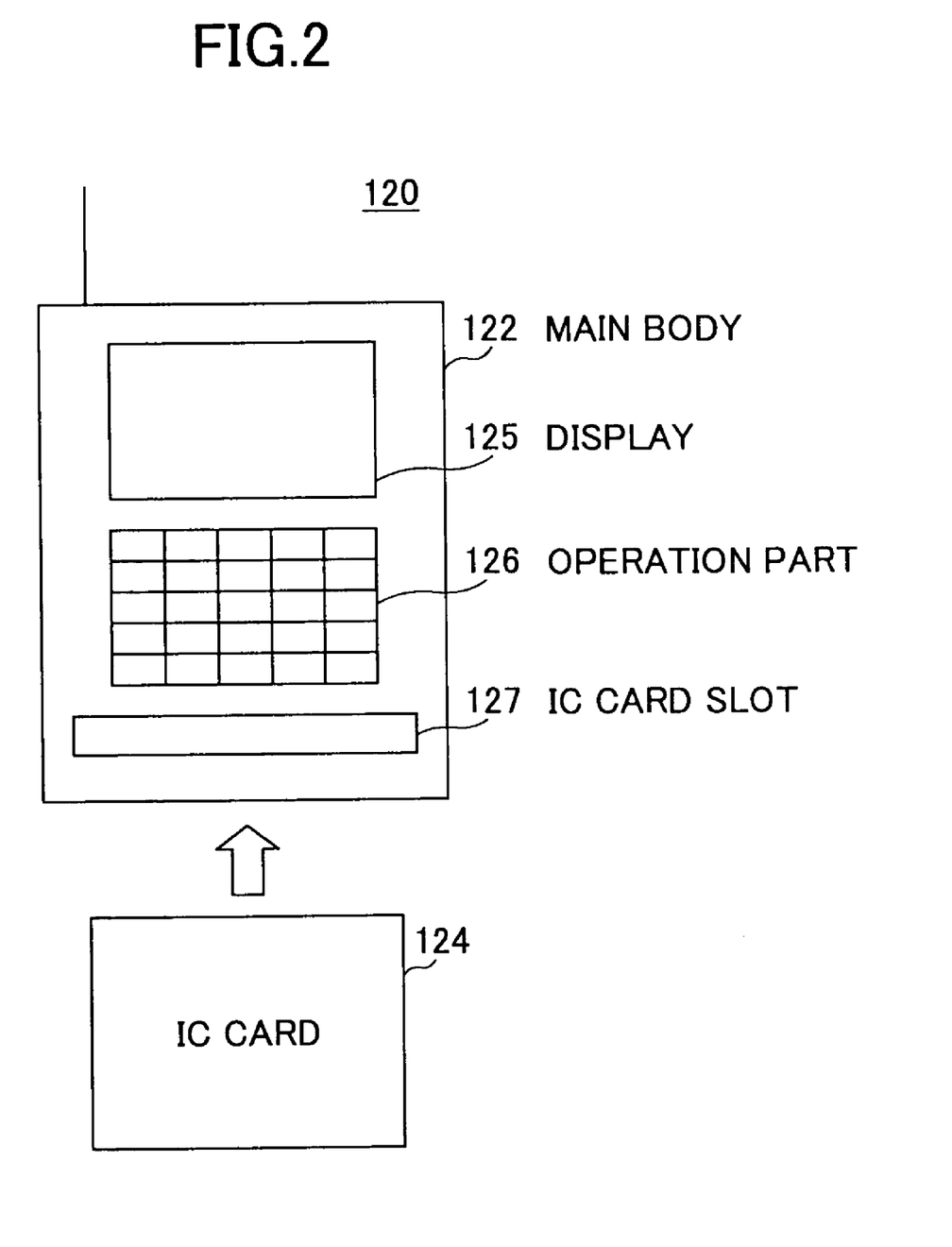
FIG. 2 is a schematic view of a shared communication terminal according to an embodiment of the present invention.

FIG. 2 shows a schematic view of a shared communication terminal according to the present invention. The shared communication terminal 120 may be, for example, a communication terminal employed in a third generation mobile communication system. The main body 122 of the shared communication terminal 120 has a display 125 such as a liquid crystal display, an operation part 126 such as a key pad, and an IC card slot 127 for inserting an IC card 124.

Figure 3:
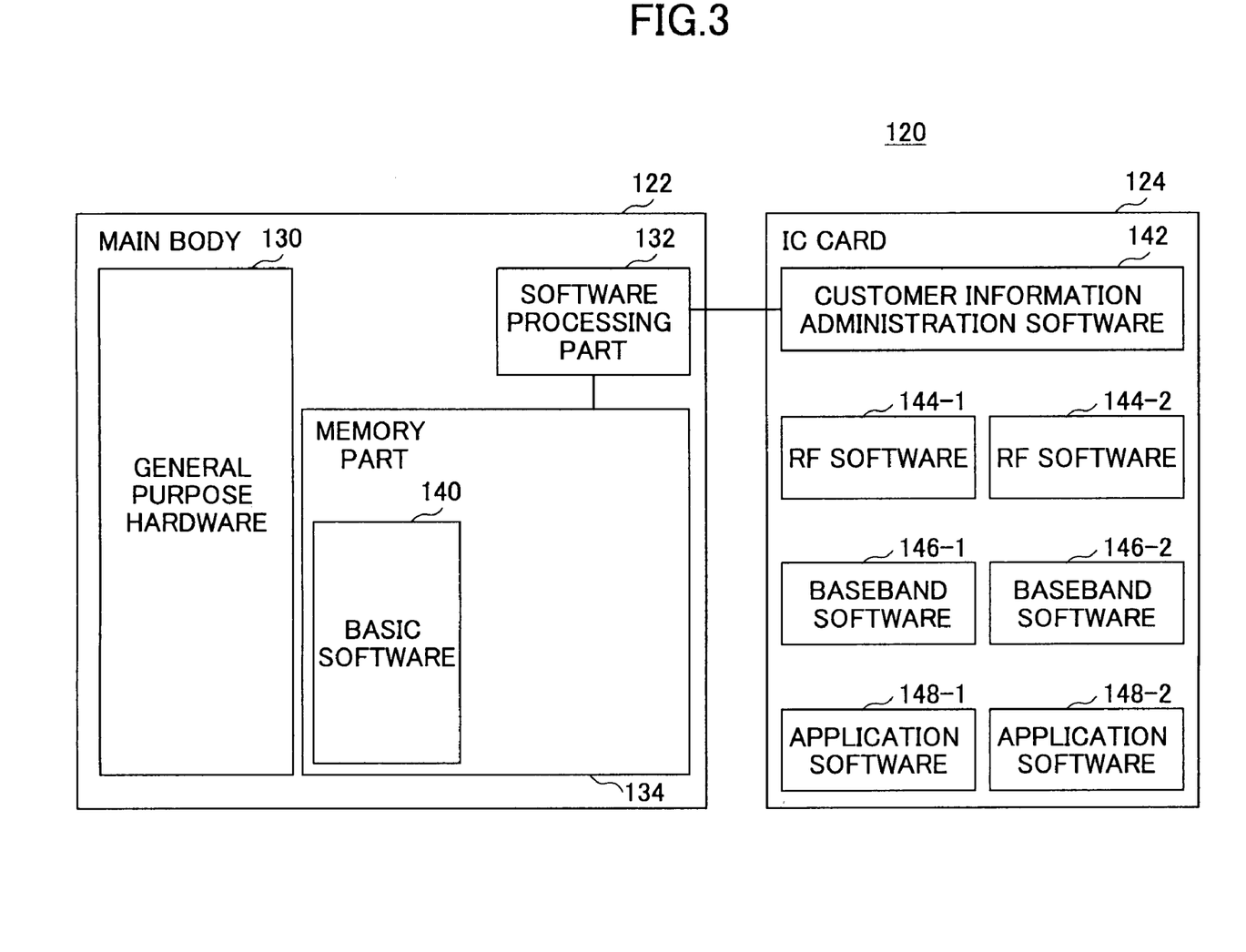
FIG. 3 is a block diagram of the inside structure of the shared communication terminal shown in FIG. 2.

FIG. 3 shows the block diagram of an example of the inside structure of the shared communication terminal 120. The shared communication terminal 120 shown in FIG. 3 comprises a main body 122 and an IC card 124. The main body 122 includes general purpose hardware 130, a software processing part 132, and a memory part 134.

The memory part 134 stores basic software 140. This basic software 140 is common software necessary for utilizing each of the radio communication services provided by the plural radio communication systems.

The IC card 124 stores a customer information administration software program 142, RF software programs 144-1, 144-2 (hereinafter referred to merely as "radio frequency (RF) software 144" for indicating both RF software programs), baseband software programs 146-1, 146-s (hereinafter referred to merely as "baseband software 146" for indicating both baseband software programs), and application software programs 148-1, 148-2 (hereinafter referred to merely as "application software 148" for indicating both application software programs).

Out of these software programs stored in the IC card 124, the RF software 144-1, the baseband software 146-1 and the application software 148-1 compose a communication software package necessary for utilizing a first radio communication service provided by a first radio communication system. And the RF software 144-2, the baseband software 146-2 and the application software 148-2 compose another communication software package necessary for utilizing a second radio communication service provided by a second radio communication system.

The customer information administration software 142 is for administering customer information (such as a telephone number assigned to the shared communication terminal 120, information relating to communication services available to the shared communication terminal 120, etc.) existing in the core network 102. The RF software 144 is for processing signal transmission and reception (such as signal detection) between the shared communication terminal 120 and the bases station 106. The baseband software 146 is related to signal modulation and demodulation such as digital conversion of received signals. The application software 148 is for processing user applications such as JAVA (a registered trademark) or other applications for outputting sound or displaying characters and images and so on.

The general purpose hardware 130 performs common hardware processing necessary for utilizing each of the communication services provided by the multiple communication systems.

The software processing part 132, cooperating with the general purpose hardware 130, selects one communication software package out of the communication software packages stored in the IC card 124, corresponding to a communication system to be utilized, and executes the selected communication software package and the basic software in the memory part 140.

In more detail, the software processing part 132 identifies a radio signal having the maximum reception strength out of a plurality of radio signals transmitted from the base station 106, and specifies the communication service provided by the communication system corresponding to the maximum reception radio signal. Alternatively, the software processing part 132 specifies a communication service in response to user's instruction.

Next, the software processing part 132 selects a communication software package necessary for utilizing the specified communication service, composed of the RF software 144, the baseband software 146 and the application software 148. For example, each radio communication service provided by each communication system is previously assigned identification information (communication service identification information), that uniquely identifies one communication service. Each communication software package necessary for utilizing the respective communication service is stored together with the respective identification information in the IC card 124. In this manner, the software processing part 132 can search for and select the communication software package corresponding to the specified communication service, using such assigned communication service identification information as a search key.

When the software processing part 134 processes signal transmission and reception, it cooperates with the general purpose hardware 130 and executes the basic software 140 and the selected RF software 144. When the software processing part 134 processes signal modulation and demodulation, it cooperates with the general purpose hardware 130 and executes the basic software 140 and the selected baseband software 146. When the software processing part 134 processes application processing, it cooperates with the general purpose hardware 130 and executes the basic software 140 and the selected application software 148.

Figure 4:
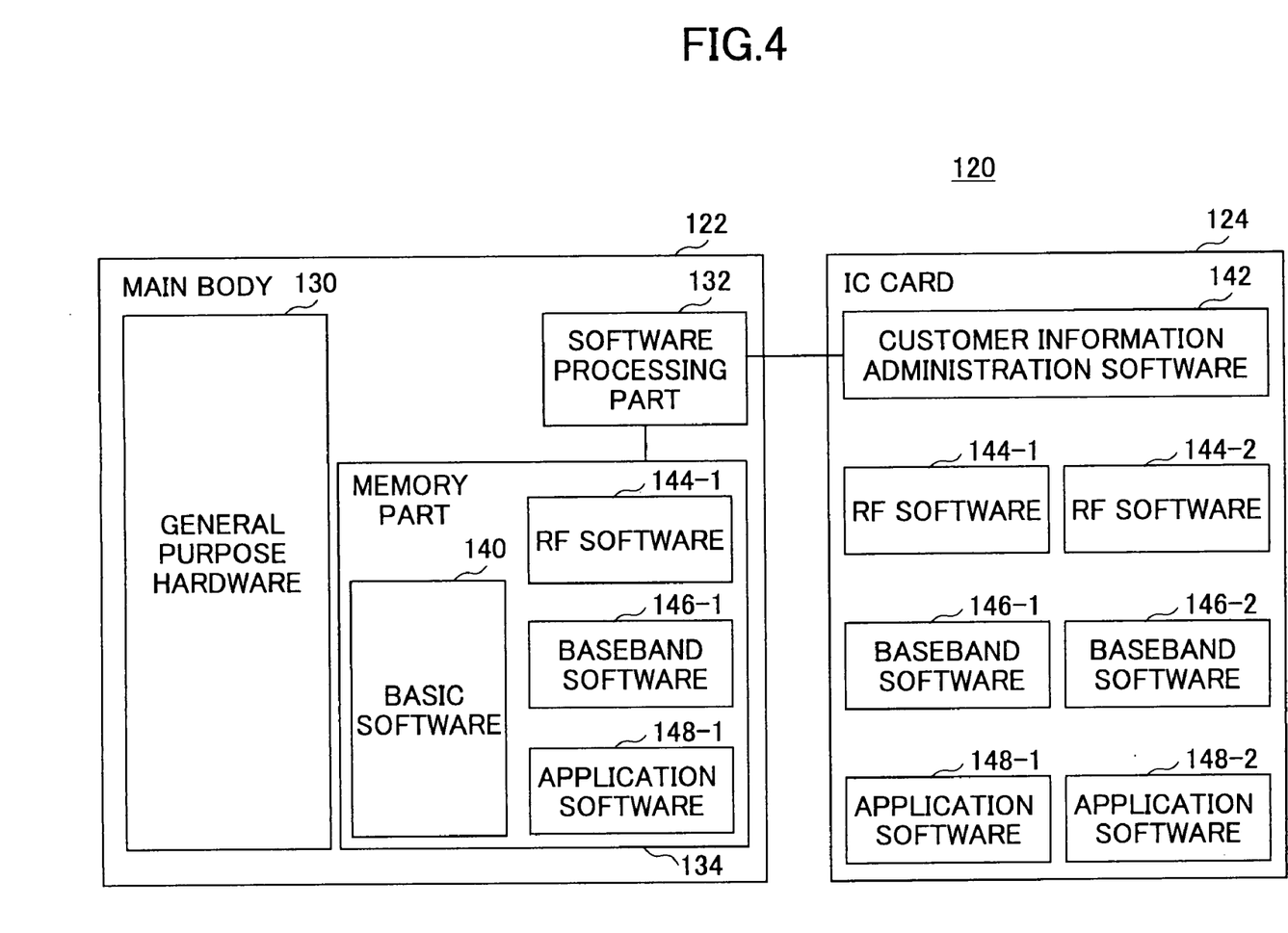
FIG. 4 is another block diagram of the inside structure of the shared communication terminal shown in FIG. 2.

The shared communication terminal 120 shown in FIG. 3 can directly execute the communication software stored in the IC card 124. However, the shared communication terminal 120 can also read the communication software into the main body 122 and then execute the read communication software. In this case, as shown in FIG. 4, the software processing part 132 specifies one communication service to be utilized, reads out a communication software package composed of a RF software program 144, a baseband software program 146 and an application software program 148 necessary for utilizing the specified communication service from the IC card 124, and stores the so-composed communication software package in the rewritable memory part 134. Then the software processing part 132, the same as shown in FIG. 3, cooperates with the general purpose hardware 130 and executes the basic software 140, the stored RF software 144, the stored baseband software 146 and the stored application software 148.

The software processing part 132 can cooperate with the general purpose hardware 130 and receive communication software transmitted from the software server 108 connected to the core network 102, and store it in the IC card 124. In a case where the IC card maintenance tool 110 has written communication software into the IC card 124, the software processing part 132 identifies the written communication software when the IC card 124 is inserted into the IC card slot 127.

Figure 5:
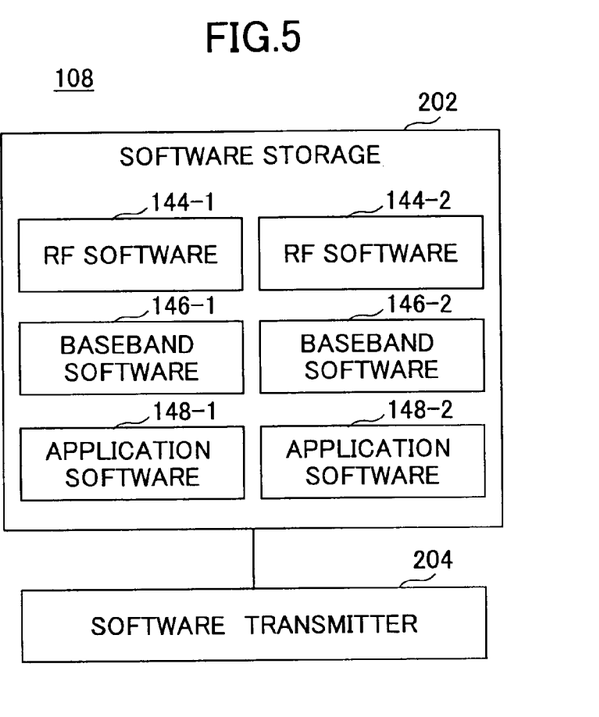
FIG. 5 is a block diagram of the inside structure of a software server according to present invention.

FIG. 5 shows the block diagram of an example structure inside the software server 108. The software server 108 shown in FIG. 5 includes a software storage 202 and a software transmitter 204.

The software storage 202 stores communication software packages (RF software 144, baseband software 146 and application software 148) to be transmitted to the shared communication terminal 120.

The software transmitter 204 identifies a communication service available to the shared communication terminal 120, based on the customer information existing in the core network 102. The software transmitter 202 further reads out a communication software package necessary for utilizing the identified communication service from the software storage 202, and transmits it to the shared communication terminal 120 via the core network 102, the switching system 104 and the base station 106.

Figure 6:
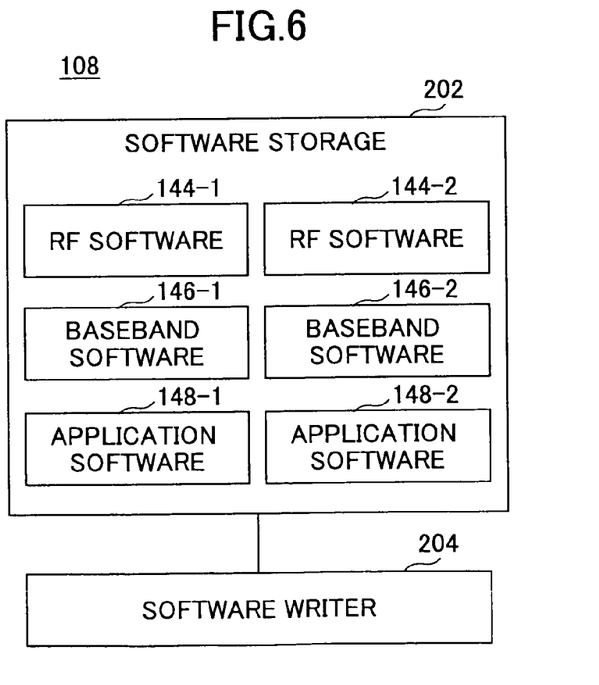
FIG. 6 is a block diagram of an IC card maintenance tool according the present invention.

FIG. 6 shows the block diagram of an example structure inside the IC maintenance tool 110. The IC maintenance tool 110 shown in FIG. 6 includes a software storage 212 and a software writer 214.

The software storage 212 stores communication software packages (RF software 144, baseband software 146 and application software 148) to be written into the IC card 124 of the shared communication terminal 120.

The software writer 214 can perform two kinds of processing. In a case where the IC card maintenance tool 110 is not connected to the core network 102 but stands alone, the software writer 214 selects a communication software package in the software storage 212 and writes it into the IC card 124 in response to an operator's selection of communication software.

On the other hand, in a case where the IC card maintenance tool 110 is connected to the core network 102, the software writer 214 identifies a communication service available to the shared communication terminal 120, based on the customer information existing in the core network 102. The software transmitter 202 further reads out the communication software package necessary for utilizing the identified communication service from the software storage 212, and writes it into the IC card 124. This case can reduce the operator's workload, and avoid the operational mistake of writing a communication software package corresponding to an unavailable communication service to the IC card 124.

As explained above, in the communication software distribution system 100 according to the embodiment of the present invention, the shared communication terminal 120 acquires communication software packages from the software server 108 or the IC card maintenance tool 110, selects a communication software package corresponding to a communication service to be utilized, and executes the selected communication software package. The general purpose hardware 130 performs common hardware processing only, and other processing unique to each communication service is performed by the software processing part 132 using the appropriate communication software package stored in the IC card 124. Therefore, the shared communication terminal 120 depends as little as possible on the hardware, and can easily utilize many communication services provided by many radio communication systems.

The communication software is stored in the IC card 124, but not in the main body of the shared communication terminal 120. Therefore, when a user changes his/her communication terminal, he/she only has to insert the original IC card into a new communication terminal to reduce or avoid inconvenience of the terminal changing process.

According to the embodiment of the present invention, the general purpose hardware performs common hardware processing only, and other processing unique to each communication service is performed by the software processing part using the appropriate communication software package stored in the IC card. Therefore, the shared communication terminal depends as little as possible on the hardware, and can easily utilize many communication services provided by many radio communication systems.

Since a plurality of communication software packages necessary for utilizing communication services provided by a plurality of communication system are stored in an IC card, when a user wants to change his/her communication terminal, he/she only has to insert the original IC card into a new communication terminal to reduce or avoid inconvenience of the terminal changing process.

The present application is based on Japanese Priority Patent Application No. 2002-218174 filed on Jul. 26, 2002 with the Japanese Patent Office, the entire contents of which are hereby incorporated by reference.

What is claimed is:

1. A communication terminal capable of utilizing a plurality of radio communication services respectively provided by a plurality of radio communication systems establishing a shared radio communication system, comprising:
- a hardware processing unit configured to perform common hardware processing necessary for utilizing the radio communication services;
- an IC card configured to store a plurality of communication software packages necessary for the respective radio communication services;
- a software selection unit configured to select one communication software package out of the communication software packages stored in the IC card for utilizing the specified and identified communication service;
- a software executing unit configured to execute the selected communication software package; and
- a software acquisition unit configured to acquire via a network another communication software package stored in a remote server provided in the shared communication system.

2. The communication terminal as claimed in claim 1, wherein
- the communication software package stored in the IC card comprises a software program relating to signal transmission/reception, a software program relating to signal modulation/demodulation and a software program relating to application.

3. The communication terminal as claimed in claim 1, wherein
- the software selection unit comprises a software reading unit configured to read the selected one of the communication software packages stored in the IC card, the selected one corresponding to the communication service to be utilized.

4. A software transmitting server, comprising:
- a software storing unit configured to store a plurality of communication software packages respectively necessary for utilizing a plurality of communication services respectively provided by a plurality of radio communication systems;
- a software transmitting unit configured to transmit via a core network the stored communication software packages to a communication terminal; and
- a software acquisition unit configured to acquire via a network another communication software package stored in a remote server provided in a shared communication system,
wherein the software transmitting unit is further configured to to read out a communication software package necessary for utilizing the identified communication service from the software storing unit.

5. An IC card writing apparatus, comprising:
- a software storing unit configured to store a plurality of communication software packages respectively necessary for utilizing a plurality of communication services respectively provided by a plurality of radio communication systems; and
- a software writing unit configured to write via a core network the stored communication software packages to an IC card to be attached to a communication terminal; and
- a software acquisition unit configured to acquire via a network another communication software package stored in a remote server provided in a shared communication system,
wherein the software writing unit is configured to read out a communication software package necessary for utilizing the identified communication service from the software storing unit, and to write it into the IC card.

* * * * *